3,190,942
CYANOALKYL ARYLENETHIAZOLESULFENA-
MIDE ACCELERATORS
Albert F. Hardman, Northampton Township, Summit County, Ohio, assignor to The Goodyear Tire & Rubber Company, Akron, Ohio, a corporation of Ohio
No Drawing. Filed June 17, 1955, Ser. No. 516,311
6 Claims. (Cl. 260—788)

This invention relates to the vulcanization of rubber and more particularly relates to a new class of compounds which are accelerators of vulcanization of rubber.

It is an object of this invention to provide a new class of accelerators of vulcanization of rubber. It is another object of this invention to provide accelerators of vulcanization of rubber which are of the delayed action or non-scorching type. A further object is to provide a method of accelerating the vulcanization of rubber whereby scorching is minimized or prevented and vulcanized rubber of good quality is obtained. Further objects will appear hereinafter as the description of the invention proceeds.

The cyanoalkyl-2-arylenethiazolesulfenamides are a new class of compounds and are very effective in accelerating the vulcanization of both natural and synthetic rubbers. The new compounds can be prepared by oxidizing a mixture of a 2-mercaptoarylenethiazole and a cyano alkyl secondary amine in an alkaline aqueous medium with an oxidizing agent such as chlorine, bromine, hypochlorous acid, hypobromous acid or the alkali metal or alkaline earth metal salts of hypochlorous or hypobromous acid. Other methods of preparing the sulfenamides of this invention are the reaction of the N-chloroamine with a 2,2'-bis-arylenethiazyldisulfide in the presence of an excess of the amine and the oxidation of the 2-mercaptoarylenethiazole or 2,2'-bis-arylenethiazyldisulfide and the amine with tertiarybutylhypochlorite in a solvent.

The preparation of the accelerator compounds is illustrated by the following example:

EXAMPLE A

Thirty-three grams of 2,2'-bis-benzothiazyldisulfide, 40 grams of beta-cyanoethyl-tertiarybutylamine and 30 milliliters of methanol were placed in a small flask which was equipped with a stirrer and a reflux condenser. Eighteen grams of N-chloro-beta-cyanoethyl-tertiarybutylamine were added and the mixture was stirred and heated under refluxing conditions for about one and one-half hours. One hundred milliliters of methanol were added and the mixture was filtered while still hot. The filtrate was cooled and stirred until the product crystallized. One hundred twenty-five milliliters of water were added and the product was filtered off and washed with water. The product was recrystallized twice from methanol and dried. It melted at 96–98° C. Analysis of the product for nitrogen and sulfur showed that it contained 13.9% of nitrogen and 21.6 of sulfur. The theoretical nitrogen and sulfur content of beta-cyanoethyl-tertiarybutyl-2-benzothiazolesulfenamide is 14.4% and 22.0% respectively.

Various 2-mercaptoarylenethiazoles can be used for preparing the accelerators of this invention, including the 2-mercaptobenzothiazoles and the 2-mercaptonaphthothiazoles. Representative examples are 2-mercaptobenzothiazole
6-chloro-2-mercaptobenzothiazole
4-ethoxy-2-mercaptobenzothiazole
6-phenyl-2-mercaptobenzothiazole
6-nitro-2-mercaptobenzothiazole
4-methyl-2-mercaptobenzothiazole
5-ethyl-2-mercaptobenzothiazole
6-tertiarybutly-2-mercaptobenzothiazole
2-mercaptonaphthothiazole Thiazylidisulfides formed from the above mercaptothiazoles can also be used to prepare the sulfenamides of this invention.

Likewise, various cyanoalkyl secondary amines can be used to prepare the accelerators of this invention. Examples of such amines are monocyanoalkyl-monoalkyl amines such as beta-cyanoethyl-methyl-amine, beta-cyanoethylethylamine, beta-cyanoethyl-propyl-amine, beta-cyanoethyl-isopropyl-amine, beta-cyanoethyl-n-butyl-amine, beta-cyanoethyl-tertiarybutyl-amine, beta-cyanoethyl-secondarybutyl-amine and the beta-cyanoethyl-amyl amines; monocyanoalkyl-monoaralkyl amines such as beta-cyanoethyl - benzylamine; monocyanoalkyl - monocycloalkyl amines such as beta-cyanoethyl-cyclopentyl-amine and beta-cyanoethyl-cyclohexyl-amine; and similar cyanosubstituted amines in which the cyanoalkyl group can be cyanoalkyls such as cyano-propyl, cyano-butyl, cyano-amyl, cyanohexyl, etc.; and di-cyanoalkyl amines such as di-beta-cyanoethylamine and various other di-cyano-substituted di-alkyl secondary amines as di(cyano-propyl) amine, di(cyanobutyl) amine, di(cyano-amyl) amine, and di(cyanohexyl) amine.

Further representative examples of the cyanoalkylsulfenamides of the invention are Beta-cyanoethyl-methyl-2-benzothiazolsulfenamide
Beta-cyanoethyl-ethyl-2-benzothiazolesulfenamide
Beta-cyanoethyl-tertiarybutyl-2-benzothiazolesulfenamide
Beta-cyanoethyl-benzyl-2-benzothiazolesulfenamide
Beta-cyanoethyl-cyclohexyl-2-benzothiazolesulfenamide
Di-beta-cyanoethyl-2-benzothiazolesulfenamide
Di-gamma-cyanopropyl-2-benzothiazolesulfenamide
Beta-cyanoethyl-methyl-2-naphthothiazolesulfenamide
Beta-cyanoethyl-tertiarybutyl-2-naphthothiazolesulfenamide
Beta-cyanoethyl-benzyl-2-naphthothiazolefenamide
Beta-cyanoethyl-cyclohexyl-2-naphthothiazolesulfenamide
Di-beta-cyanoethyl-2-naphthothiazolesulfenamide The vulcanization of rubber by the use of these sulfenamides is illustrated in the following tests using several representative compounds as accelerators of vulcanization. In these tests the stocks were milled on a conventional two-roll rubber mill until the compounding ingredients were thoroughly mixed with the rubber and a homogeneous composition was obtained. In Table 1 the proportions are expressed as parts by weight.

Table 1
COMPOUND FORMULA

|  | A | B | C | D |
|---|---|---|---|---|
| Natural rubber smoked sheets | 100 | 100 | 100 | 100 |
| Stearic acid | 3 | 3 | 3 | 3 |
| Paraflux | 3 | 3 | 3 | 3 |
| Pine tar | 2 | 2 | 2 | 2 |
| Antioxidant | 1 | 1.5 | 1.5 | 1 |
| Zinc oxide | 3 | 3 | 3 | 3 |
| Sulfur | 2.5 | 2.5 | 2.5 | 2.5 |
| Dibeta-cyanoethyl-2-benzothiazolesulfenamide | .6 | | | |
| N-oxy-diethylene-2-benzothiazolesulfenamide | | .5 | | |
| Beta-cyanoethyl-methyl-2-benzothiazolesulfenamide | | | .6 | |
| Beta-cyanoethyl-tertiary-butyl-2-benzothiazole-sulfenamide | | | | .6 |

In the above table Paraflux is a petroleum residue used as a softener for rubber.

The above stocks were cured by heating in a press at 275° F. The physical properties are listed in Table 2 below.

Table 2

| Cure in Minutes at 275° F. | A | B | C | D |
|---|---|---|---|---|
| | Ultimate Tensile Strength in Pounds Per Square Inch | | | |
| 15 | ---- | 1,450 | 1,200 | ---- |
| 30 | 700 | 3,700 | 3,420 | 2,050 |
| 45 | 1,750 | 3,700 | 3,530 | 3,100 |
| 60 | 2,450 | 3,650 | 3,625 | 3,800 |
| | Elongation in percent | | | |
| 15 | ---- | 520 | 470 | ---- |
| 30 | 500 | 550 | 560 | 550 |
| 45 | 500 | 510 | 530 | 540 |
| 60 | 530 | 490 | 530 | 550 |
| | Modulus at 300 percent Elongation in Pounds Per Square Inch | | | |
| 15 | ---- | 575 | 500 | ---- |
| 30 | 280 | 1,850 | 1,450 | 800 |
| 45 | 750 | 2,050 | 1,725 | 1,400 |
| 60 | 1,025 | 2,075 | 1,800 | 1,800 |

As shown above, the cyano-substituted alkylthiazole sulfenamides are delayed action, non-scorching accelerators. The N-oxy-diethylene-2-benzothiazolesulfenamide included in these tests is a well-known accelerator of the sulfenamide type. The cyano compounds are slower acting accelerators than is the N-oxy-diethylene-2-benzothiazolesulfenamide selected for comparison.

The examples in the tables above illustrate the invention with respect to the acceleration of the vulcanization of natural rubber. These materials are also useful for the acceleration of synthetic rubbers which are vulcanized in a manner similar to natural rubber, such as the butadiene-styrene rubbers, the butadiene-acrylonitrile rubbers, butyl rubbers and other rubber-like materials obtained by the polymerization of diene hydrocarbons.

The invention has been illustrated with respect to the use of 0.6 part of the accelerator per 100 parts by weight of the rubber. Other proportions can be used, in general from 0.5 to 5.0 parts being sufficient for most purposes. The preferred range of accelerators of this type is from 1.0 to 3.0 parts by weight per 100 parts by weight of the rubber. These accelerators can be used in conjunction with other accelerators such as 2-mercaptobenzothiazole, the dithiocarbamates, the thiuramdisulfides and other accelerators, if desired. They may also be used in conjunction with activators and the pigments, oils, waxes, tackifying agents and other compounding ingredients generally used in rubber goods.

While certain representative embodiments and details have been shown for the purpose of illustrating the invention, it will be apparent to those skilled in this art that various changes and modifications may be made therein without departing from the spirit or scope of the invention.

I claim:

1. The method of vulcanizing rubber which comprises heating rubber and sulfur in the presence of a beta-cyanoethyl-alkyl-2-arylenethiazolesulfenamide.

2. The method of vulcanizing rubber which comprises heating rubber and sulfur in the presence of a beta-cyanoethyl-alkyl-2-benzothiazolesulfenamide.

3. The method of vulcanizing rubber which comprises heating rubber and sulfur in the presence of beta-cyanoethyl-methyl-2-benzothiazolesulfenamide.

4. The method of vulcanizing rubber which comprises heating rubber and sulfur in the presence of beta-cyanoethyl-ethyl-2-benzothiazolesulfenamide.

5. The method of vulcanizing rubber which comprises heating rubber and sulfur in the presence of beta-cyanoethyl-tertiarybutyl-2-benzothiazolesulfenamide.

6. The method of vulcanizing rubber which comprises heating rubber and sulfur in the presence of beta-cyanoethyl-isopropyl-2-benzothiazolesulfenamide.

References Cited in the file of this patent

UNITED STATES PATENTS

| | | |
|---|---|---|
| 1,989,469 | Tepema | Jan. 29, 1935 |
| 2,514,208 | Smith | July 4, 1950 |
| 2,560,045 | Smith | July 10, 1951 |
| 2,564,788 | Morgan | Aug. 21, 1951 |
| 2,581,932 | Smith | Jan. 8, 1952 |
| 2,595,334 | Clapp et al. | May 6, 1952 |

FOREIGN PATENTS

| | | |
|---|---|---|
| 596,056 | Great Britain | Dec. 24, 1947 |